Feb. 23, 1965  G. H. BALDING  3,170,978
APPARATUS FOR DISPLAYING RELATIVELY DISPLACEABLE
SUPERPOSED SIMULATIVE PATTERNS
Filed Dec. 14, 1962

INVENTOR.
GEORGE H. BALDING
BY
AGENT

United States Patent Office 3,170,978
Patented Feb. 23, 1965

3,170,978
APPARATUS FOR DISPLAYING RELATIVELY DISPLACEABLE SUPERPOSED SIMULATIVE PATTERNS
George H. Balding, Fremont, Calif., assignor, by mesne assignments, to the United States of America as represented by the Secretary of the Navy
Filed Dec. 14, 1962, Ser. No. 244,848
4 Claims. (Cl. 35—10.4)

This invention relates to a display apparatus and more particularly to a system providing various presentations of simulated flight path relative to a simulated real world presentation.

Simulation of real world conditions outside an aircraft is electronically feasible, i.e., it is possible to cause a television or cathode ray screen to depict a facsimile of sky, ground and horizon relative to an aircraft. The height and angle of the simulated horizon line may be varied in accordance with pitch and roll of the aircraft to provide in visual display realistic indications of aircraft attitude to the pilot.

It is also electronically feasible to depict in relationship to the simulated real world conditions aircraft flight path which is a triangular pattern with apex at the horizon line and pointed in the relative line or direction of flight of the aircraft. Typical of these types of electronic simulation systems are those disclosed in applications Serial No. 728,019, now Patent 3,093,822, granted June 11, 1963, and Serial No. 16,438, now Patent 3,118,128, granted Jan. 14, 1964; each of George H. Balding, filed Apr. 11, 1958, and Mar. 21, 1960, respectively.

The present invention contemplates an apparatus wherein the simulated flight path superimposed on simulated real world presentation displayed on a television type screen may be moved according to three modes; namely, flight path locked in roll to the real world horizon, flight path locked in roll to the aircraft, and flight path independent of both.

Thus, dependent on the particular presentation desired by the pilot, the television type screen may show the horizon line and flight path moving together in response to aircraft roll, the horizon line alone moving in response to aircraft roll, or the flight path alone moving in response to roll or independently in response to some other function of the aircraft.

Therefore, it is an object of the present invention to provide a display apparatus wherein a pattern simulative of actual aircraft flight path superimposed on a display screen over a pattern of real world conditions may be displaced relative to the pattern of real world conditions either independently or in response to roll of the aircraft.

Another object of the present invention is to provide an electronic display of a pattern simulative of actual aircraft flight path superimposed over a pattern simulative of real world conditions wherein each pattern may be displaced together in response to aircraft roll.

A further object of the present invention is to provide a display on a television type screen of a pattern simulative of actual direction of flight of an aircraft superimposed on a pattern simulative of the ground, sky and horizon relative to the aircraft wherein the pattern simulative of the actual ground and horizon may be displaced in response to aircraft roll while the pattern simulative of direction of flight of the aircraft remains stationary on the screen.

The exact nature of this invention as well as other objects and advantages thereof will be readily apparent from consideration of the following specification relating to the annexed drawing in which.

Figure 1:
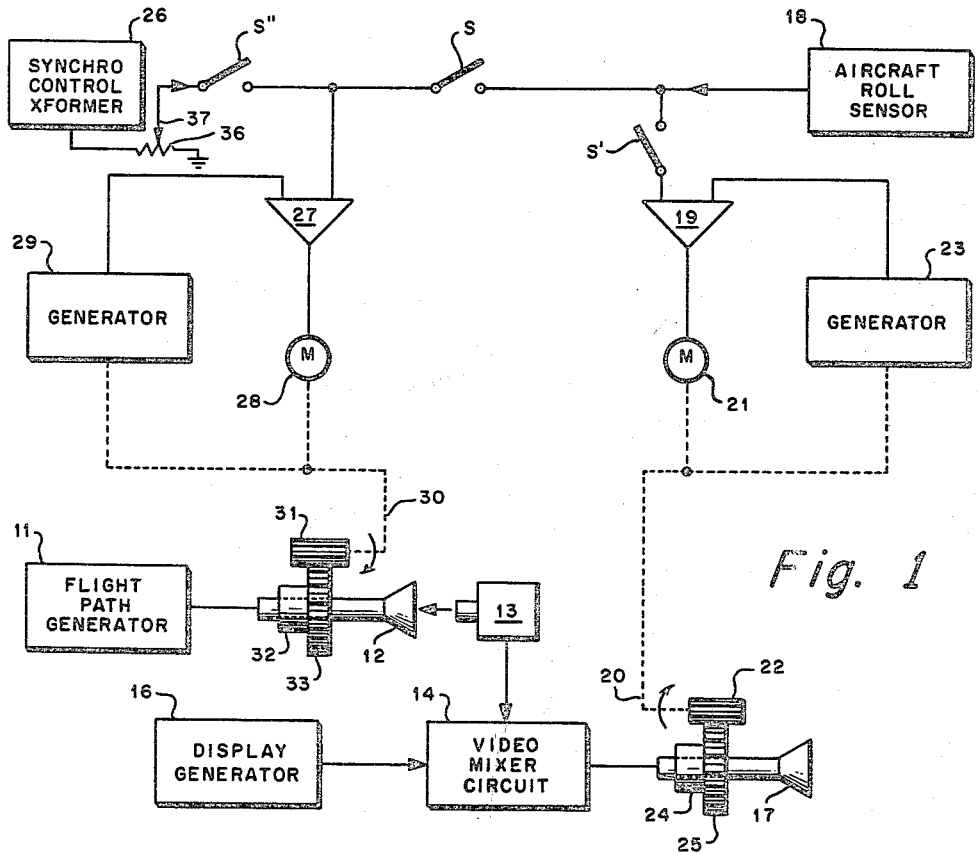
FIG. 1 illustrates partly in block diagram form a preferred embodiment of the present invention.

Referring now in detail to FIG. 1, there is shown a flight path generator 11 coupled to the video portion of a cathode ray tube 12. The face of the cathode ray tube 12 then displays a triangular shaped pattern with the base at the lowest portion thereof and the apex located halfway up the face of the tube. This triangular shaped pattern is photographed by vidicon camera 13 which is a small television type camera. The output of camera 13 is fed directly into video mixer circuit 14. The output of display generator 16 is also fed into mixer circuit 14.

The details of the circuitry of flight path generator 11 and display generator 16 which generate the signals necessary for the flight path and real world patterns, respectively, are not part of this invention. Each of the generators is more fully discussed in the above-mentioned applications.

Figure 2A:
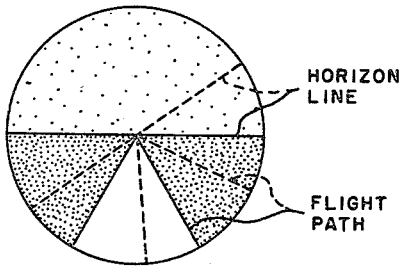
FIGS. 2a and 2b represent two types of relative movement of the flight path.
Figure 2B:
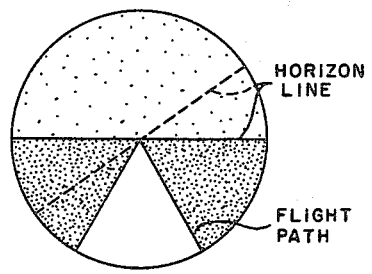

Mixer circuit 14 combines the output signal from camera 13 and display generator 16 and provides display cathode ray tube 17 with video information such that there is presented on the face of cathode ray tube 17 the horizon line, sky and ground texture pattern with the flight path pattern superimposed thereon. The display on the face of cathode ray tube 17 is represented in FIGS. 2a and 2b.

Aircraft roll sensor 18 provides an output signal proportional to aircraft roll. Aircraft roll sensor 18 may be of the conventional gyro type which convert physical roll into a voltage and which is standard equipment on many aircraft. This signal is first amplified by amplifier 19 and then used to energize motor 21. Motor 21 via shaft 20 drives pinion 22 an amount proportional to aircraft roll. The direction in which pinion 22 is rotated depends on the direction of aircraft roll. The output of motor 21 is connected to the input of amplifier 19 through a conventional servo feedback loop which includes generator 23. The feedback loop functions to null the roll signal when pinion 22 has rotated an amount proportional to aircraft roll.

Cathode ray tube 17 is equipped with a rotatable deflection yoke 24. Deflection yoke 24 has a gear 25 which may be integral with the deflection yoke 24 or otherwise attached thereto so that deflection yoke 24 is rotated when the gear 25 is rotated. Pinion 22 drives gear 25 and, therefore, deflection yoke 24 is rotated an amount proportional to aircraft roll.

The output of aircraft roll sensor 18 is also utilized to energize motor 28 via amplifier 27. Motor 28 and amplifier 27 have associated therewith a feedback servo loop including generator 29, which operates in a manner identical with the above discussed feedback loop. Pinion 31 is driven an amount equal to the amount that pinion 22 is driven. However, pinion 31 is driven in a direction opposite to the direction in which pinion 22 is driven. This opposite direction rotation of pinions 22 and 31 is achieved by connecting shaft 30 on the side of pinion 31 opposite to the side at which pinion 22 is connected to shaft 20.

Cathode ray tube 12 has a rotatable deflection yoke 32 attached to gear 33 for rotation thereby. Gear 33 is driven by pinion 31 to rotate deflection yoke 32 an amount proportional to aircraft roll.

A switch S is connected in the conductor 33 which connects aircraft roll sensor 18 to amplifier 27. A switch S' may disconnect roll sensor 18 from amplifier 19.

The deflection yokes 24 and 32 may be rotated individually or together to provide one of three modes of relative movement of the displayed patterns. These three modes are when (1) the flight path is locked in roll to the real world horizon, (2) the flight path is locked in roll to the aircraft, and (3) the flight path may be independently rotated on the screen of cathode ray tube 17.

When switch S is in the open position and switch S' is closed, motor 21 alone is energized to thereby effect rotation of deflection yoke 24 an amount proportional to aircraft roll. In this mode, the flight path is displaced on the screen an amount equal to the displacement of the real world pattern or more simply the horizon line. This situation is illustrated in FIG. 2a which depicts the relationship of the flight path to the rest of the pattern much as it would appear on the screen of cathode ray tube 17. Thus, in this mode when the aircraft rolls, the flight path and horizon line are displaced equally on the screen as indicated by the dashed lines.

When switch S and S' are closed, the output from aircraft roll sensor 18 energizes both of motors 21 and 28 to displace deflection yokes 24 and 32 equal amounts proportional to aircraft roll but in opposite directions. The result of this is that although the horizon line on the screen of cathode ray tube 17 is displaced according to aircraft roll, the flight path pattern remains stationary on the screen, i.e., does not move relative to the aircraft itself. This situation is depicted in FIG. 2B.

Mode 3 provides for the independent movement of the flight path pattern on the screen. This may be done by providing a synchro control transformer 26 as separate additional source of energizing voltage for motor 28. When switch S" is closed, manual or automatic variation of arm 37 of potentiometer 36 will cause independent movement of the flight path pattern regardless of whether either or both of switches S or S' are opened or closed. It is noted that switch S" should not be closed when switch S is closed.

The latter mode is particularly useful in calibrating or accurately lining up the flight path pattern on the screen or may be responsive to some other attitude of the aircraft. The first two modes are of immediate usefulness to a pilot who may wish to view aircraft roll simulated on a screen with or without relative movement of the flight path pattern with respect to the aircraft.

Obviously many modifications and variations of the present invention are possible in the light of the above teaching. It is therefore to be understood that within the scope of the appended claims, the invention may be practiced otherwise than as specifically described.

What is claimed is:

1. A display apparatus comprising in combination:

flight path generator means, cathode ray tube means connected to said flight path generator means displaying on its face a pattern simulative of the flight path of an aircraft;

vidicon camera means adjacent to the face of said cathode ray tube means photographing said pattern simulative of flight path;

video mixer means connected to said vidicon camera means;

display generator means generating a signal representative of sky, ground and horizon relative to the aircraft connected to said video mixer means;

second cathode ray tube means connected to said video mixer means displaying on its face a pattern simulative of sky, ground and horizon relative to the aircraft with said flight path pattern superimposed thereon;

first rotatable yoke means mounted on the neck of said first cathode ray tube means;

aircraft roll sensor means connected to said first rotatable yoke means rotating said first rotatable yoke means an amount proportional to the roll of the aircraft;

second rotatable yoke means mounted on the neck of said second cathode ray tube means;

means connecting said aircraft roll sensor means to said second rotatable yoke means rotating said second rotatable yoke means an amount proportional to the roll of the aircraft in a direction opposite to that of the direction of rotation of said first rotatable yoke means;

whereby said pattern simulative of the sky, ground and horizon relative to the aircraft is rotated an amount proportional to roll while the pattern simulative of the flight path pattern remains fixed.

2. A display apparatus comprising in combination:

flight path generator means, cathode ray tube means connected to said flight path generator means displaying on its face a pattern simulative of the flight path of an aircraft, vidicon camera means adjacent to the face of said first cathode ray tube means photographing said pattern simulative of flight path, video mixer means connected to said vidicon camera means, display generator means generating a signal representative of sky, ground and horizon relative to the aircraft connected to said video mixer means, second cathode ray tube means connected to said video mixer means displaying on its face a pattern simulative of sky, ground and horizon relative to the aircraft with said flight path pattern superimposed thereon, first rotatable yoke means mounted on the neck of said first cathode ray tube means, second rotatable yoke means mounted on the neck of said second cathode ray tube means, aircraft roll sensor means providing a voltage proportional to roll of the aircraft, motor means connected between said aircraft roll sensor means and said first and second rotatable yoke means rotating each of said first and second rotatable yokes an amount proportional to roll of the aircraft, means connected between said motor means and said second rotatable yoke means causing said second rotatable yoke means to rotate in a direction opposite to that of said first rotatable yoke means.

3. A display apparatus comprising in combination:

flight path generator means, cathode ray tube means connected to said flight path generator means displaying on its face a pattern simulative of the flight path of an aircraft, vidicon camera means adjacent to the face of said first cathode ray tube means photographing said pattern simulative of flight path, video mixer means connected to said vidicon camera means, display generator means generating a signal representative of sky, ground and horizon relative to the aircraft connected to said video mixer means, second cathode ray tube means connected to said video mixer means displaying on its face a pattern simulative of sky, ground and horizon relative to the aircraft with said flight path pattern superimposed thereon, first rotatable yoke means mounted on the neck of said first cathode ray tube means, second rotatable yoke means mounted on the neck of said second cathode ray tube means, aircraft roll sensor means providing a voltage proportional to roll of the aircraft, first motor means connected between said aircraft roll sensor means and said second rotatable yoke means for rotating said second rotatable yoke means an amount proportional to roll of the aircraft, second motor means connected between said aircraft roll sensor means and said first rotatable yoke means for rotating said first rotatable yoke means an amount proportional to roll of the aircraft in a direction opposite to the direction of rotation of said second rotatable yoke means, first switch means connected between said aircraft roll sensor means and said second motor means for disconnecting said aircraft roll sensor means from said second motor means whereby said second rotatable yoke alone may be rotated, second switch means connected between said aircraft roll sensor means and said first motor means for disconnecting said aircraft roll sensor means from said first motor means whereby said first rotatable yoke alone may be rotated.

4. A display apparatus comprising in combination:

flight path generator means, cathode ray tube means connected to said flight path generator means displaying on its face a pattern simulative of the flight path of an aircraft, vidicon camera means adjacent to the face of said first cathode ray tube means photographing said pattern simultaive of flight path, video mixer means connected to said vidicon camera means, display generator means generating a signal representative of sky, ground and horizon relative to the aircraft connected to said video mixer means, second cathode ray tube means connected to said video mixer means displaying on its face a pattern simulative of sky, ground and horizon relative to the aircraft with said flight path pattern superimposed thereon, first rotatable yoke means mounted on the neck of said first cathode ray tube means, second rotatable yoke means mounted on the neck of said second cathode ray tube means, aircraft roll sensor means providing a voltage proportional to roll of the aircraft, first motor means connected between said aircraft roll sensor means and said second rotatable yoke means for rotating said second rotatable yoke means an amount proportional to roll of the aircraft, second motor means connected between said aircraft roll sensor means and said first rotatable yoke means for rotating said first rotatable yoke means an amount proportional to roll of the aircraft in a direction opposite to the direction of rotation of said second rotatable yoke means, voltage source means connected to said second motor means for independently rotating said first rotatable yoke means, first switch means connected between said aircraft roll sensor means and said second motor means for disconnecting said aircraft roll sensor means from said second motor means whereby said second rotatable yoke alone may be rotated, second switch means connected between said aircraft roll sensor means and said first motor means for disconnecting said aircraft roll sensor means from said first motor means whereby said first rotatable yoke alone may be rotated.

References Cited by the Examiner
UNITED STATES PATENTS

| | | | |
|---|---|---|---|
| 2,406,751 | 9/46 | Emerson | 35—10.4 |
| 2,740,205 | 4/56 | Shamis | 35—10.4 |
| 2,946,996 | 7/60 | Wassell | 343—5 |
| 3,121,223 | 2/64 | Roberts | 343—17 |

CHESTER L. JUSTUS, *Primary Examiner.*
MAYNARD R. WILBUR, *Examiner.*